United States Patent [19]
Wang

[11] Patent Number: 5,967,573
[45] Date of Patent: Oct. 19, 1999

[54] BUMPER ENERGY ABSORBER

[75] Inventor: Jenne-Tai Wang, Troy, Mich.

[73] Assignee: General Motors Corporation, Detroit, Mich.

[21] Appl. No.: 09/182,065

[22] Filed: Oct. 29, 1998

[51] Int. Cl.$^6$ .................................................. B60R 19/40
[52] U.S. Cl. ......................................... 293/119; 293/118
[58] Field of Search .................................... 293/118, 119

[56] References Cited

U.S. PATENT DOCUMENTS

| | | | |
|---|---|---|---|
| 3,346,292 | 10/1967 | Lundman | 293/118 |
| 3,355,208 | 11/1967 | Brock | 293/118 |
| 3,947,061 | 3/1976 | Ellis | 293/118 |
| 4,518,183 | 5/1985 | Lee | 293/118 |
| 5,096,242 | 3/1992 | Chin-Hun | 293/118 |
| 5,370,429 | 12/1994 | Reuber et al. | 293/119 |

OTHER PUBLICATIONS

Jawad, "Intelligent Hydraulic Bumper for Frontal Collision Mitigation", AMD vol. 218; Crashworthiness and Occupant Protection in Transportation System, ASME 1996, pp. 181–189.

Primary Examiner—Gary C. Hoge
Attorney, Agent, or Firm—Jeffrey A. Sedlar

[57] ABSTRACT

A motor vehicle bumper energy absorber including an outer tube on a body of the motor vehicle, an inner tube and a bumper bar supported on the outer tube for linear translation between a retracted position and an extended position, an actuator for translating the inner tube and bumper bar, and a resistance medium for converting into work a fraction of the kinetic energy of an impact on the bumper bar. The actuator includes a shuttle on the inner tube, an actuator rod connected to the shuttle, and a plurality of spheres in wedge-shaped grooves in the inner tube. The actuator rod pushes the shuttle against the inner tube to translate the bumper bar from its retracted to its extended position. An impact on the bumper bar in its extended position causes the spheres to wedge against the outer tube. The actuator rod pulls the shuttle against the inner tube to translate the bumper from its extended position to its retracted position while fingers on the shuttle engage the spheres and prevent wedging of the latter against the outer tube. The wedged spheres constitute a resistance medium by plowing tracks in the outer tube.

5 Claims, 3 Drawing Sheets

BUMPER ENERGY ABSORBER

TECHNICAL FIELD

This invention relates to a motor vehicle bumper energy absorber.

BACKGROUND OF THE INVENTION

A motor vehicle typically has a bumper bar supported on a body of the motor vehicle by energy absorbers which convert into work a fraction of the kinetic energy of a low speed impact on the bumper bar. Such bumper energy absorbers commonly include relatively moveable structural elements attached to the body and the bumper bar and a resistance medium between the structural elements. In a high speed impact, kinetic energy is converted into work by plastic deformation of body structure of the motor vehicle between a passenger compartment thereof and the point of impact. As motor vehicles have become more compact, however, the energy absorbing capability of the body structure of the motor vehicle has decreased as the span between the passenger compartment and the bumper bar has decreased. A bumper energy absorber described in U.S. Pat. No. 5,370,429 supports a bumper bar close to a body of a motor vehicle except when sensors on the vehicle detect an impending impact. In that circumstance, the bumper energy absorber extends the bump bar out from the body to increase the span between the passenger compartment and the bumper bar and thereby increase the fraction of the kinetic energy of a high speed impact on the bumper bar that is converted into work. A bumper energy absorber according to this invention is a novel alternative to the bumper energy absorber described in the aforesaid U.S. Pat. No. 5,370,429.

SUMMARY OF THE INVENTION

This invention is a new and improved motor vehicle bumper energy absorber including an outer tube on a body of the motor vehicle, an inner tube and a bumper bar supported on the outer tube for linear translation between a retracted position of the bumper bar near the body and an extended position of the bumper bar more remote from the body, an actuator for translating the bumper bar between its extended and retracted positions, and a resistance medium for converting into work a fraction of the kinetic energy of an impact on the bumper bar. The actuator includes a shuttle on the inner tube, an actuator rod on the vehicle body connected to the shuttle, and a plurality of spheres in wedge-shaped grooves in the inner tube facing the outer tube. The actuator rod pushes the shuttle against the inner tube to translate the bumper bar from its retracted to its extended position. An impact on the bumper bar in its extended position causes the spheres to wedge against the outer tube. The actuator rod pulls the shuttle against the inner tube to translate the bumper from its extended position to its retracted position while fingers on the shuttle engage the spheres and prevent wedging of the latter against the outer tube. The spheres wedged against the outer tube constitute a resistance medium by plowing tracks in the outer tube when an impact translates the bumper bar from its extended position to its retracted position. In a modified embodiment, the spheres wedged against the outer tube rigidly unite the inner and the outer tubes while perforated portions of the inner and the outer tubes constituting the resistance medium plastically deform.

DESCRIPTION OF THE PREFERRED EMBODIMENT

Figure 1:
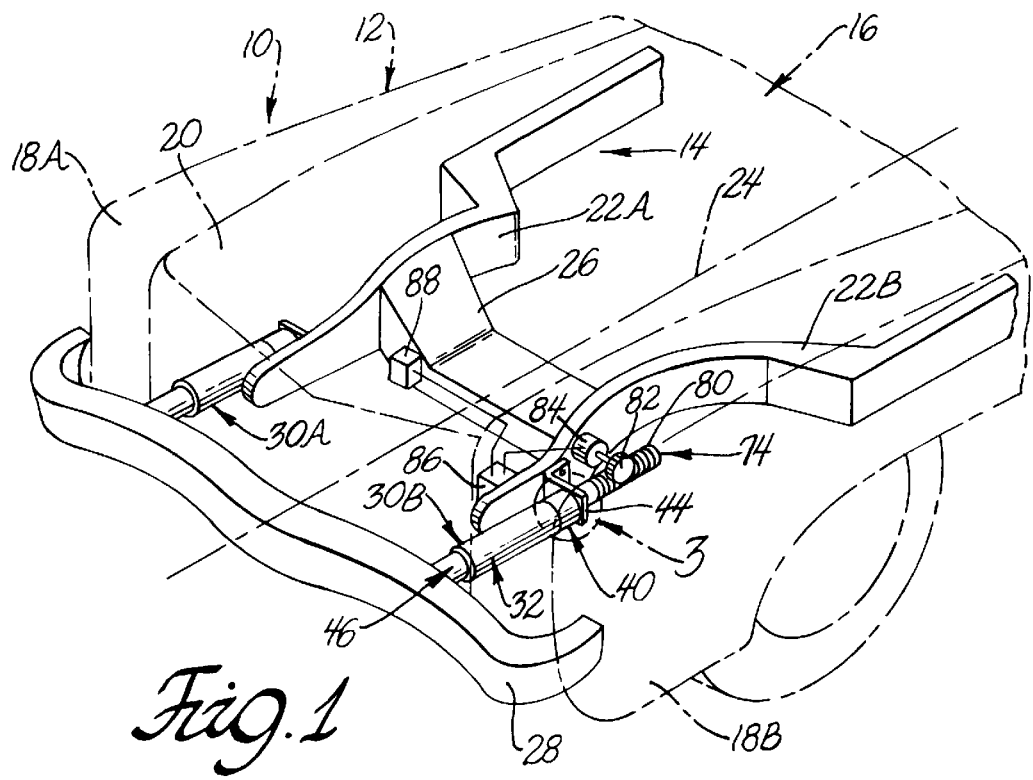
FIG. 1 is a fragmentary perspective view of a motor vehicle having thereon a bumper energy absorber according to this invention.
Figure 2:
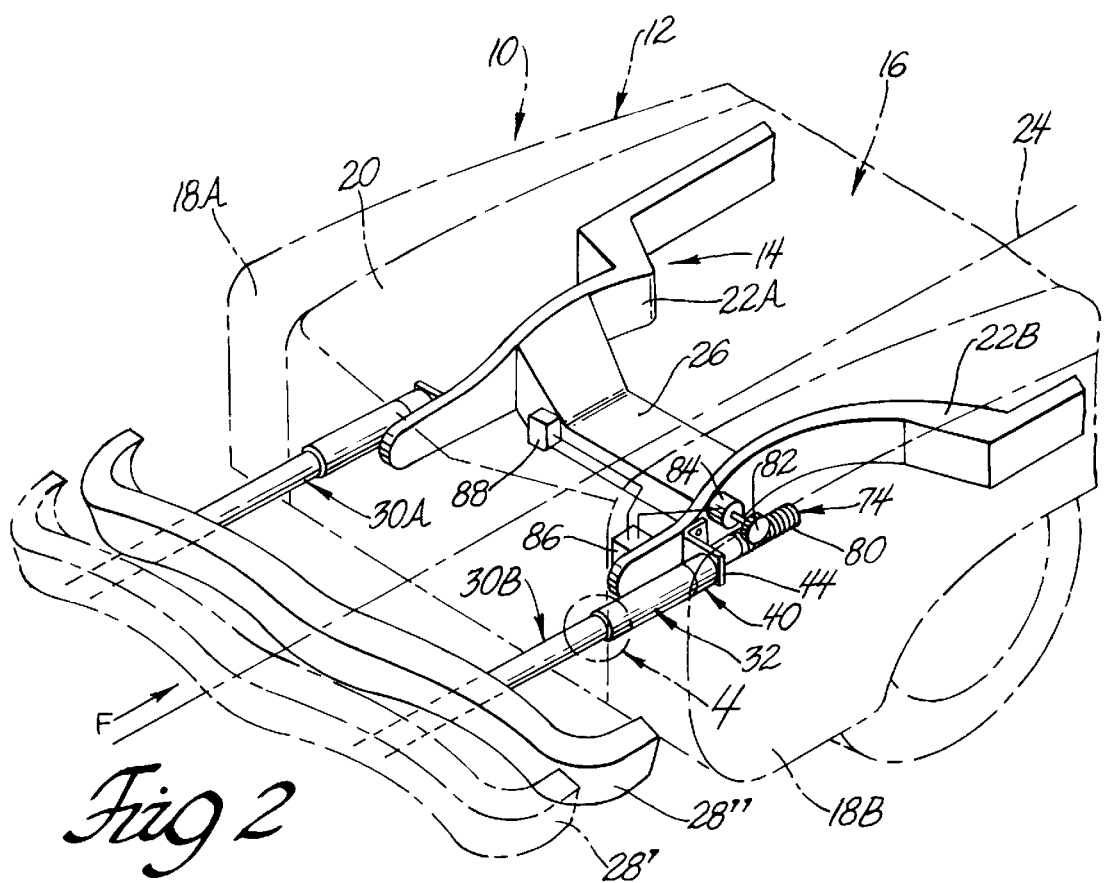
FIG. 2 is similar to FIG. 1 but showing structural elements of the bumper energy absorber according to this invention in different relative positions.

Referring to FIGS. 1-2, a motor vehicle 10 includes a schematically represented body 12 consisting of a structural frame portion 14 and a body portion 16 attached to or integral with the frame portion. The body portion 16 terminates at a pair of fender panels 18A,18B separated by a deck panel 20. The frame portion 14 includes a pair of frame rails 22A,22B parallel to a longitudinal centerline 24 of the motor vehicle rigidly interconnected by a cross member 26. A bumper bar 28 of the motor vehicle 10 is supported on the body 12 by a pair of bumper energy absorbers 30A,30B according to this invention.

The bumper energy absorber 30B, representative of both bumper energy absorbers 30A,30B, includes a cylindrical outer tube 32 having a longitudinal centerline 34 parallel to the longitudinal centerline 24 of the motor vehicle 10. The outer tube 32 may have any convenient cross sectional shape other than circular. An end 36 of the outer tube, FIG. 3, bears against a flat base 38 of a mounting bracket 40 within a tubular boss 42 of the mounting bracket. The mounting bracket 40 is rigidly connected to the vehicle body 12 through a schematically represented L-shaped support 44 between the mounting bracket and the frame rail 22B. Other rigid attachments between the body 12 and the outer tube 32 may be substituted for the mounting bracket 40 and the L-shaped support 44. The bumper energy absorber 30A is similarly rigidly connected to the frame rail 22A.

Figure 3:
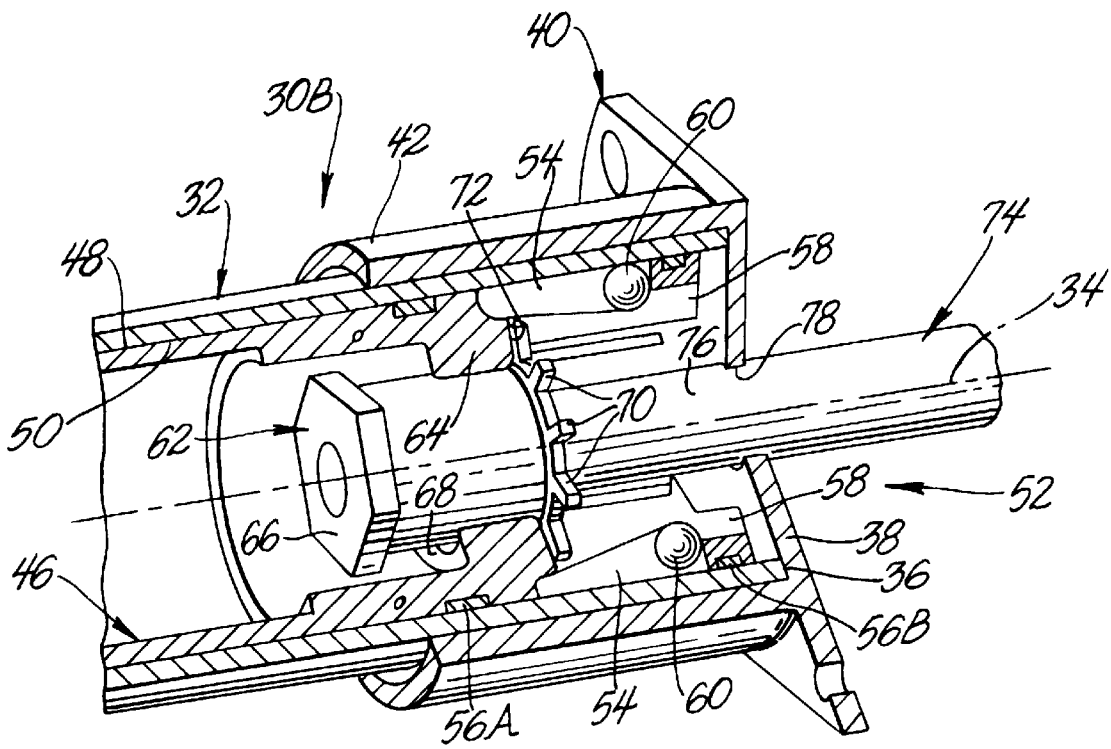
FIG. 3 is an enlarged, broken-away view the portion of FIG. 1 identified by reference circle 3 in FIG. 1.
Figure 4:
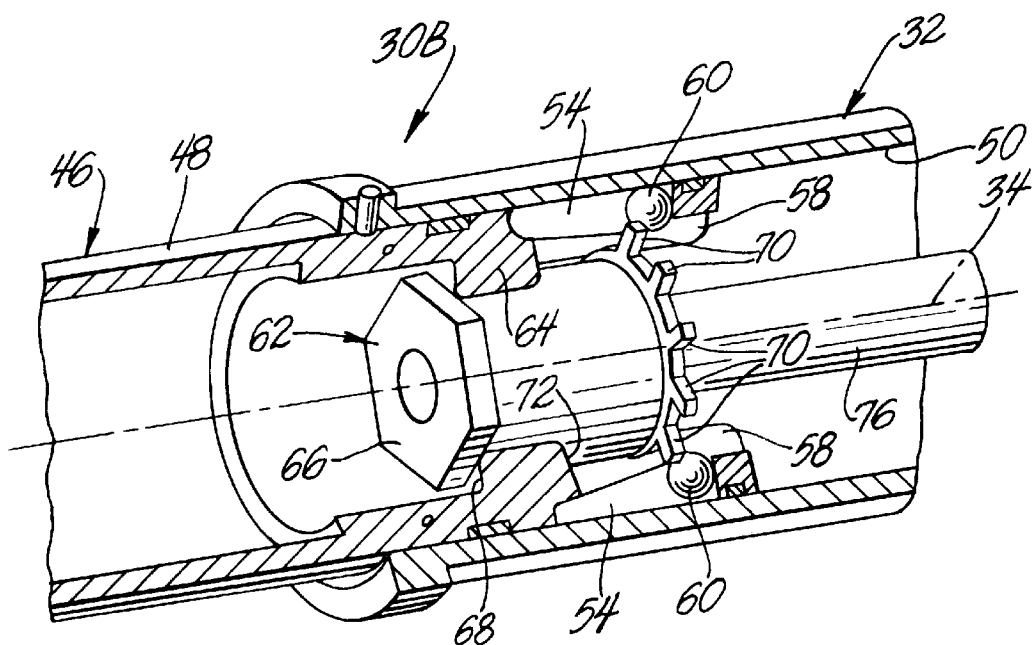
FIG. 4 is an enlarged, broken-away view the portion of FIG. 2 identified by reference circle 4 in FIG. 2.

An inner tube 46 of the bumper energy absorber 30B is supported on the outer tube 32 for back and forth linear translation in the direction of the longitudinal centerline 34 of the outer tube with an outer cylindrical wall 48 of the inner tube facing an inner cylindrical wall 50 of the outer tube, FIGS. 3-4. The cross sectional shape of the inner tube matches the cross sectional shape of the outer tube. A distal end, not shown, of the inner tube is attached to the bumper bar 28 so that the inner tube and the bumper bar are supported on the body 12 through the outer tube 32 for linear translation between an extended position 28', FIG. 2, of the bumper bar and a retracted position of the bumper bar, FIG. 1. In its retracted and extended positions, the bumper bar is close to the body 12 and more remote from the body 12, respectively.

As seen best in FIGS. 3-4, an actuator 52 of the bumper energy absorber 30 includes a plurality of wedge-shaped grooves 54, in the outer cylindrical wall 48 of the inner tube parallel to the longitudinal centerline 34 of the outer tube and facing the inner cylindrical wall 50 thereof. The wedge-shaped grooves 54 are disposed between a pair of bearing rings 56A,56B on the inner tube which cooperate in maintaining concentricity between the inner and the outer tubes during relative linear translation therebetween. The inner tube 46 is interrupted by a plurality of radial slots 58 which intersect respective ones of the wedge-shaped grooves 54.

Respective ones of a plurality of hard spheres 60, e.g. steel spheres, are disposed in respective ones of the wedge-shaped grooves 54 over the radial slots 58 in the inner tube. The diameters of the spheres 60 are substantially the same as the depths of the wedge-shaped grooves at the deep ends thereof to minimize contact between the spheres and the inner cylindrical wall 50 of the outer tube when the spheres are lodged at the deep ends of the wedge-shaped grooves.

A tubular shuttle 62 of the actuator 52 is supported on a web 64 of the inner tube 46 near the end thereof inside of the outer tube for back and forth linear translation relative to the inner tube in the direction of the longitudinal centerline 34 of the outer tube. A hex-shaped lip 66 on the shuttle 62 bears against an annular first land 68 on the web 64 to limit relative linear translation therebetween in one direction. A plurality of radial fingers 70 on the shuttle 62 at the opposite end thereof from the hex-shaped lip 66 bear against an annular second land 72 on the web 64 to limit relative linear translation between the shuttle and the inner tube in the other direction. The radial fingers 70 slide back and forth in respective ones of the radial slots 58 in the inner tube and radially overlap the wedge-shaped grooves 54 between the spheres 60 therein and the shallow ends thereof.

An actuator rod 74 of the actuator 52 is supported on the frame rail 22B for back and forth linear translation in the direction of the longitudinal centerline 34 of the outer tube. An end 76 of the actuator rod protrudes into the outer tube 32 through an aperture 78 in the base 38 of the mounting bracket 40, FIG. 3, and is rigidly attached to the shuttle 62. A rack gear 80 on the actuator rod 74 at end thereof opposite the shuttle meshes with a pinion gear 82 on the end of an output shaft of an electric motor 84 mounted on the frame portion 14 of the vehicle body. A schematically represented electronic control module ("ECM") 86 on the vehicle body 12 is connected to the electric motor 84 and to a sensor 88 which monitors the velocity of the motor vehicle. The ECM 86 turns the electric motor 84 on and off in accordance with electronic signals from the sensor 88 to induce back and forth linear translation of the actuator rod 74. It is within the scope of this invention to employ other devices, e.g. air cylinders, screw motors, hydraulic cylinders, and the like, to induce back and forth linear translation of the actuator rod 74.

When the ECM 86 turns the electric motor on to rotate the pinion gear clockwise, FIGS. 1-2, with the bumper bar 28 in its retracted position, the pinion gear induces leftward linear translation, FIGS. 1-4, of the actuator rod 74 and the shuttle 62. The radial fingers 70 on the shuttle engage the annular second land 72 on the web 64 on the inner tube 46, FIG. 3. The thrust of the pinion gear 82 on the actuator rod is transferred through the shuttle to the inner tube to induce linear translation thereof and the bumper bar 28 relative to the outer tube to the extended position 28' of the bumper bar. The direction of relative movement between the inner and the outer tubes 46,32 causes the spheres 60 to remain lodged in the deep ends of the wedge-shaped grooves 54 so that linear translation of the inner tube relative to the outer tube is unopposed by spheres. With the electric motor turned off, the rack gear 80 and the pinion gear 82 maintain the bumper bar in its extended position.

When the ECM 86 turns the electric motor on to rotate the pinion gear counterclockwise, FIGS. 1-2, with the bumper bar 28 in its extended position 28', the pinion gear 82 induces rightward linear translation, FIGS. 1-4, of the actuator rod 74 and the shuttle 62. The shuttle translates to the right relative to the inner tube until the hex-shaped lip 66 on the shuttle engages the annular first land 68 on the web 64 on the inner tube, FIG. 4. The trust of the pinion gear is then transferred through the shuttle to the inner tube to induce linear translation of the bumper bar through an intermediate position 28", FIG. 2, to its retracted position, FIG. 1. Concurrently, the radial fingers 70 on the shuttle engage respective ones of the spheres 60 and confine the spheres to the deep ends of the wedge-shaped grooves 54 to prevent the spheres from wedging against the cylindrical inner wall 50 of the outer tube and interfering with linear translation of the bumper bar. With the electric motor turned off, the rack gear 80 and the pinion gear 82 maintain the bumper bar in its retracted position.

With the electric motor turned off and the bumper bar 28 in its extended position 28', an impact on the bumper bar represented by a vector force "F", FIG. 2, induces linear translation of the inner tube 46 relative to the shuttle 62 until the annular second land 72 on the inner tube engages the radial fingers 70 on the shuttle. The thrust on the inner tube attributable to the impact on the bumper bar is transferred through the shuttle to the actuator rod 74 which translates to the right, FIGS. 1-4, as a unit with the inner tube as the rack gear 80 backdrives the pinion gear 82 and the electric motor. At the same time, the radial fingers 70 are lodged at the shallow ends of the wedge-shaped grooves 54 remote from the spheres 60.

With the radial fingers 70 remote from the spheres 60, relative linear translation between the inner and the outer tubes 46,32 causes the spheres to roll in the wedge-shaped grooves 54 toward the shallow ends thereof until the spheres become wedged against the inner cylindrical wall 50 of the outer tube. Thereafter, the spheres constitute a resistance medium of the bumper energy absorber which plastically deforms the outer tube by plowing tracks therein to convert into work a fraction of the kinetic energy of the impact on the bumper bar during linear translation from its extended position to its retracted position. The resistance afforded by the spheres 60 wedged against the inner cylindrical wall 50 can be increased or reduced by adjusting the relative dimensions of the wedge-shaped grooves 54 and the spheres 60.

Figure 5:
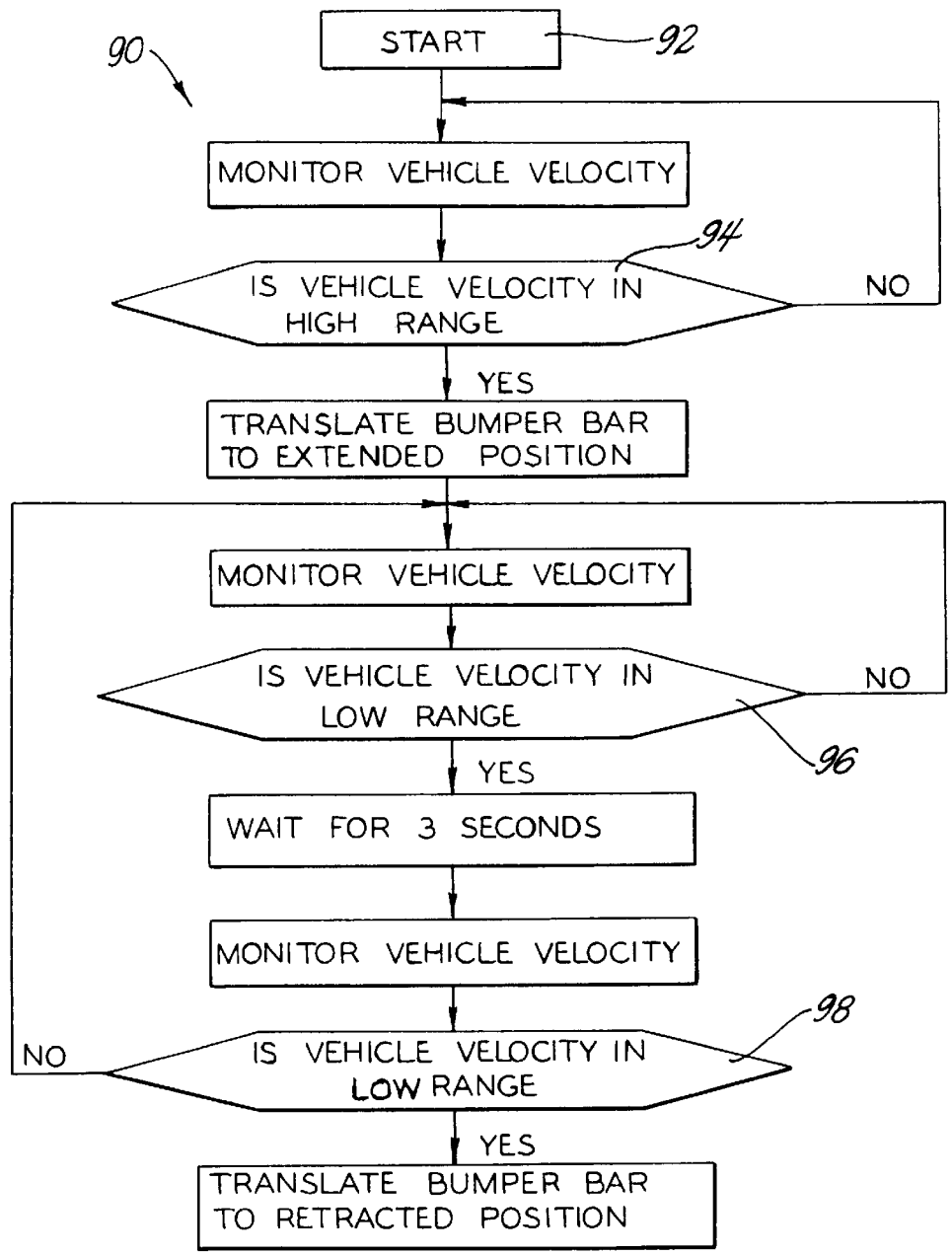
FIG. 5 is a graphic representation of an algorithm controlling the bumper energy absorber according to this invention.

Referring to FIG. 5, a flow chart 90 depicting an algorithm according to which the ECM 86 turns the electric motor 84 on and off includes a start block 92 initiated when the electrical system of the motor vehicle is turned on with the bumper bar in its retracted position. From the start block 92, the algorithm monitors the velocity of the motor vehicle through an electrical signal from the sensor 88 and asks at a decision point 94 whether the velocity of the motor vehicle is in a high range, e.g. above 15 miles per hour (MPH), in which a high speed impact is possible. If the answer is no, the ECM does not turn on the electric motor and the bumper bar remains in its retracted position. If the answer is yes, the algorithm turns on the electric motor 84 to linearly translate the bumper bar 28 to its extended position 28' in which the bumper bar is more remote from the body 12 and in which increased protection against a high speed impact is afforded.

From the decision point 94, the algorithm monitors the velocity of the motor vehicle through the electrical signal from the sensor 88 and asks at a decision point 96 whether the velocity of the motor vehicle is in a low range, e.g. less than 10 MPH, in which a high speed impact is improbable. If the answer is no, then the algorithm repeats the interrogation of vehicle velocity between the decision blocks 94,96. If the answer is yes, the algorithm interrogates vehicle velocity a second time after a delay of about 3 seconds and asks at a decision point 98 whether vehicle velocity is still in the low range. If the answer is no, then the algorithm repeats the interrogation of vehicle velocity between the decision blocks 94,96. If the answer is still yes, the algorithm turns on the electric motor 84 to linearly translate the bumper bar 28 back to its retracted position.

Figure 6:
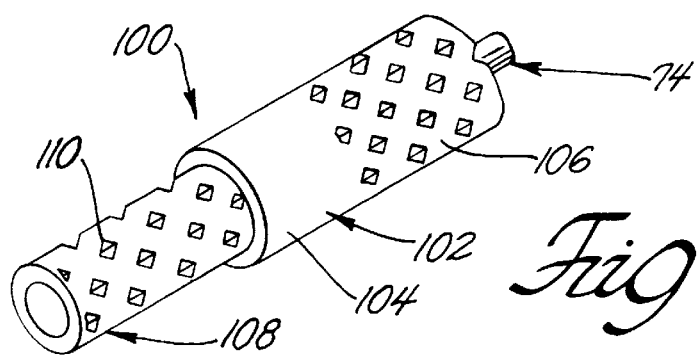
FIG. 6 is a perspective view of a modified bumper energy absorber according to this invention.

Referring to FIG. 6, a modified bumper energy absorber 100 according to this invention is identical to the bumper energy absorbers 30A,30B described above except as now recited. An outer tube 102 of the modified bumper energy absorber is adapted for rigid attachment to the vehicle body 12 and includes an uninterrupted cylindrical portion 104 near an outboard end of the outer tube and a perforated cylindrical portion 106 behind the uninterrupted portion. An inner tube 108 of the modified bumper energy absorber is adapted for rigid attachment to the bumper bar 28 and includes a perforated cylindrical portion 110 extending substantially the full length of thereof.

The actuator 52 is disposed between the vehicle body and the inner tube 108 and operates as described above to translate the bumper bar between its extended and retracted positions. With the bumper bar in its extended position 28', an impact represented by the vector force "F" causes the spheres 60 to wedge against the uninterrupted portion 104 of the outer tube 102 to thereby rigidly unite the inner and the outer tubes. In that circumstance, the interstices of the perforated portions 110,106 of the inner and the outer tubes define crush initiators at which plastic deformation of the inner and the outer tubes commences as the bumper bar is thrust from its extended position to its retracted position by the impact "F". The perforated portions of the inner and the outer tubes constitute a resistance medium of the bumper energy absorber which converts into work a fraction of the kinetic energy of the impact on the bumper bar.

Having thus described the invention, what is claimed is:

1. A motor vehicle bumper energy absorber comprising:

an outer tube rigidly attached to a body of a motor vehicle, an inner tube having an end connected to a bumper bar of said motor vehicle and supported on said outer tube for relative linear translation with said bumper bar between an extended position of said bumper bar and a retracted position of said bumper bar, a resistance medium means operative to resist linear translation of said bumper bar from said extended position to said retracted position thereof in response to an impact thereon thereby to convert into work a fraction of the kinetic energy of said impact on said bumper bar, and an actuator means on said body of said motor vehicle operative to linearly translate said inner tube between said extended and said retracted positions of said bumper bar and to prevent said resistance medium from resisting linear translation of said inner tube from said extended position to said retracted position of said bumper bar when such linear translation is effected by said actuator means wherein said actuator means comprises:

a wedge-shaped groove in an outer wall of said inner tube facing an inner wall of said outer tube, a hard sphere in said wedge-shaped groove having a diameter corresponding to the depth of a deep end of said wedge-shaped groove, a shuttle supported on said inner tube for back and forth linear translation in the direction of linear translation of said inner tube relative to said outer tube, an actuator rod supported on said body for back and forth linear translation in the direction of linear translation of said inner tube relative to said outer tube having an end rigidly connected to said shuttle, a drive means operative to effect back and forth linear translation of said actuator rod, a first stop means on said shuttle engageable on said inner tube operative to transfer thrust from said shuttle to inner tube to effect linear translation of said inner tube from said extended position of said bumper bar toward said retracted position of said bumper bar, a second stop means on said shuttle engageable on said inner tube operative to transfer thrust from said shuttle to inner tube to effect linear translation of said inner tube from said retracted position of said bumper bar toward said extended position of said bumper bar, and a radial finger on said shuttle engageable on said sphere in said wedge-shaped groove to confine said sphere to said deep end of said wedge-shaped groove concurrent with the transfer of thrust from said shuttle to inner tube to effect linear translation of said inner tube from said extended position of said bumper bar toward said retracted position of said bumper bar.

2. The motor vehicle bumper energy absorber recited in claim 1 wherein said resistance medium comprises:

said sphere being wedged against said inner wall of said outer tube in response to linear translation of said inner tube from said extended position of said bumper bar toward said retracted position of said bumper by an impact force on said bumper bar and plastically deforming said outer tube to convert into work a fraction of the kinetic energy of said impact on said bumper bar.

3. The motor vehicle bumper energy absorber recited in claim 2 wherein said resistance medium comprises:

said sphere being wedged against said inner wall of said outer tube in response to the onset of linear translation of said inner tube from said extended position of said bumper bar toward said retracted position of said bumper by an impact force on said bumper bar and rigidly uniting said inner tube and said outer tube, and a perforated portion on one of said inner tube and said outer tube defining a crush initiator at which said one of said inner tube and said outer tube plastically deforms to convert into work a fraction of the kinetic energy of said impact on said bumper bar.

4. The motor vehicle bumper energy absorber recited in claim 1 wherein said drive means comprises:

an electric motor on said body of said motor vehicle, a pinion gear rotatable in opposite directions by said electric motor, and a rack gear on said actuator rod cooperating with said pinion gear in effecting back and forth linear translation of said actuator rod in the direction of linear translation of said inner tube concurrent with rotation of said pinion gear by said electric motor.

5. The motor vehicle bumper energy absorber recited in claim 1 further comprising:

a transducer means operative to monitor the velocity of said motor vehicle, and a control means responsive to an electronic signal from said transducer means operative to turn said drive means on and off so that said bumper bar is in said extended position when the velocity of said motor vehicle is in a high range and in said retracted position when the velocity of said motor vehicle is in a low range below said high range.

* * * * *